US 6,594,709 B1

(12) United States Patent
Agasaveeran et al.

(10) Patent No.: US 6,594,709 B1
(45) Date of Patent: Jul. 15, 2003

(54) METHODS AND APPARATUS FOR TRANSFERRING DATA USING A DEVICE DRIVER

(75) Inventors: Saravanan Agasaveeran, Sunnyvale, CA (US); Rajesh Agrawal, Sunnyvale, CA (US); James Balestriere, Dulwich Hill (AU); Steven Berl, Piedmont, CA (US); Gordon Cox, Lindfield (AU); Satish Gannu, Bangalore (IN); Aniruddha Khare, Westmead (AU); M. Salim Olime, Plumpton (AU); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/405,612

(22) Filed: Sep. 24, 1999

(51) Int. Cl.$^7$ ............................................... G06F 13/10
(52) U.S. Cl. ...................... 709/321; 370/235; 709/220; 709/238; 709/246; 710/48; 710/52; 712/225
(58) Field of Search ................................ 709/220, 238, 709/246, 321; 710/48, 52; 703/22; 370/235; 712/225

(56) References Cited

U.S. PATENT DOCUMENTS

| 5,301,275 A | * | 4/1994 | Vanbuskirk et al. | ............ 710/48 |
| 5,319,754 A | * | 6/1994 | Meinecke et al. | ............. 710/52 |
| 5,469,545 A | * | 11/1995 | Vanbuskirk et al. | ......... 370/235 |
| 5,548,759 A | | 8/1996 | Lipe | ............................ 707/10 |
| 5,623,618 A | | 4/1997 | Brewer et al. | ................. 711/2 |
| 5,815,731 A | | 9/1998 | Doyle et al. | .................. 710/10 |
| 5,909,576 A | | 6/1999 | Fulk | ............................ 709/321 |
| 5,953,516 A | * | 9/1999 | Bonola | ......................... 703/22 |
| 6,026,454 A | * | 2/2000 | Hauck et al. | ................ 709/321 |
| 6,148,387 A | | 11/2000 | Galasso et al. | ............. 711/203 |
| 6,230,194 B1 | * | 5/2001 | Frailong et al. | ............. 709/220 |
| 6,353,857 B2 | * | 3/2002 | Bader et al. | ................ 709/246 |

* cited by examiner

Primary Examiner—Kenneth R. Coulter
Assistant Examiner—Hai V. Nguyen
(74) Attorney, Agent, or Firm—Chapin & Huang, L.L.C.; David E. Huang, Esq.

(57) ABSTRACT

The invention is directed to techniques for transferring data using a device driver that is arranged to prevent improper operation of a non-primary routine (e.g., an administrative operation) from causing improper operation of a primary routine (e.g., a data transfer operation). Accordingly, the primary routine can continue to operate properly after a failure of the non-primary routine. In one arrangement, a data communications device transfers data. The data communications device includes a port that couples to a network, and a processor coupled to the port. The data communications device further includes memory, coupled to the processor, that stores a device driver. The device driver has a first set of instructions that directs the processor to perform a data transfer routine that moves data between memory and the port, and a second set of instructions that directs the processor to perform an administrative routine. The second set of instructions is arranged to prevent improper operation of the administrative routine from causing improper operation of the data transfer routine. In particular, execution and communication mechanisms enable the primary and administrative routines to operate in such a fault-tolerant manner.

42 Claims, 9 Drawing Sheets

EVENT/SEMAPHORE INTERPROCESS COMMUNICATIONS

METHODS AND APPARATUS FOR TRANSFERRING DATA USING A DEVICE DRIVER

BACKGROUND OF THE INVENTION

A typical device driver is a computer program that enables computer hardware or a computer application to use or communicate with a particular device (e.g., a printer or monitor). Some specialized computer systems use device drivers to perform specialized operations. For example, in a network, a data communications device may use communications port device drivers to receive and send data (e.g., packets, cells, etc.) using input and output ports.

In general, a traditional device driver is monolithic in structure. That is, the device driver typically comprises a single series of instructions which the processor executes as a single process in order to communicate with a particular device. As the processor executes through this series of instructions, the processor serially performs a mixture of primary operations and administrative operations. For example, in a data communications device, a primary operation for a communications port device driver may be to receive data from an input port and/or to send data on an output port. Some administrative operations of the communications port device driver may be to check for requests, and to respond to such requests by (i) setting up or destroying connections, (ii) gathering statistical information, (iii) changing the manner in which resources are allocated for data transfer, and/or (iv) configuring the device port (an input or output port). Generally, the code for such administrative operations is interleaved with code for the primary operations.

In one arrangement, the processor continuously cycles through the series of instructions by jumping back (or looping back) to the beginning of the series once the end of the series is reached in order to re-perform the primary and administrative operations on a continuous basis. In another arrangement, the device driver executes through the series of instructions a fixed number of times (e.g., once) in response to a triggering event such as a wakeup notification or an interrupt from the operating system, and then suspends execution until awaken by another event.

It is common for device driver developers to further develop and improve their device drivers over time. Subsequent device driver versions typically include bug fixes (i.e., solutions to device driver defects), optimizations, and/or new features. For example, when a new version of a device is introduced to the market, the new version typically includes a new device driver designed and developed to take advantage of any new improvements or enhancements in the new version of the device.

SUMMARY OF THE INVENTION

Prior to releasing a device driver for normal use, device driver developers typically test their device drivers to identify and correct any defects (or bugs). A newly discovered defect may not have existed in earlier versions of the device driver, or may have existed but not posed a problem in the earlier versions.

The inventors of the present invention have observed that, in certain device drivers (e.g., communication port device drivers for data communications devices), bugs rarely occur in the portions of the device driver that direct the processor to perform the device driver's primary operations (e.g., receiving data from an input port or sending data to an output port). Rather, the inventors have observed that, in these particular device drivers, bugs are more likely to occur in the portions related to administrative operations (e.g., setting up or tearing-down connections, gathering statistics, and changing resource allocation parameters).

One explanation for this tendency may be that the portions of these device drivers that perform the rudimentary or primary operations are generally not susceptible to new defects. This may be because the code for the primary operations is typically mature (e.g., well developed), fairly simple, and/or short. As such, any bugs that may have existed in the past probably have long been fixed. Furthermore, it may be unlikely that future modifications are needed for these portions of code since these portions are often heavily scrutinized and tested early on in the life cycle of the device driver. Accordingly, if problems are to arise, it is likely that such problems will exist in the portions of code dealing with the administrative operations of the device drivers.

Unfortunately, when a device driver is monolithically structured as a single series of instructions for performing both primary and administrative operations (as is generally the case in a conventional device driver), and when the device driver operates as a single process, bugs in portions of code that deal with administrative operations may affect the portions of code that handle the primary operations. In particular, improper processing of a code portion for an administrative operation may lead to improper processing of a code portion for a primary operation. For example, in a conventional device driver for a data communications device, conventional driver code for a statistics gathering operation (i.e., an administrative operation of the port driver) may include a defective branch operation and interfere with conventional driver code for accessing buffered data received on an input port or destined for an output port (i.e., a primary operation). Although the conventional driver code for accessing the buffered data may have been flawless, the accessing operation can fail due to improper operations of the conventional statistics gathering driver code.

Similarly, an improper memory access by the conventional statistics gathering driver code may lead to improper operation of the conventional driver code for accessing the buffered data. For example, the conventional statistics gathering code may inadvertently overwrite a critical memory location (e.g., a particular control register) used by the conventional accessing code (i.e., the primary operation driver code for accessing the buffered data) rather than read from that location. Such an improper memory access by the conventional statistics gathering code (code for an administrative operation) may cause improper operation of the conventional accessing code (code for the primary operation).

In contrast to conventional device drivers that have code for primary and administrative operations integrated into a monolithic structure that operates as a single serial process, the invention is directed to techniques for sending and receiving data using a device driver that is arranged to prevent improper operation of a non-primary routine (e.g., an administrative operation) from causing improper operation of a primary routine (e.g., a data transfer operation). Such an arrangement enables the primary routine to continue to operate properly after a failure or improper operation of the non-primary routine.

One embodiment of the invention is directed to a data communications device for transferring data. The data communications device includes a port that couples to a network, and a processor coupled to the port. The data communications device further includes memory, coupled to the processor, that stores a device driver. The device driver has a first set of instructions that directs the processor to perform a data transfer routine that moves data between the port and the memory, and a second set of instructions that directs the processor to perform an administrative routine. The first and second sets of instructions are arranged to prevent improper operation of the administrative routine from causing improper operation of the data transfer routine.

Preferably, the administrative routine of the device driver includes at least one of the following routines: a state change routine to cause a state change in the device driver when the device driver operates in the data communications device, a control routine to cause a control change in the device driver when the device driver operates in the data communications device (e.g., storing a hardware address to perform MAC address filtering), a resource management routine to manage a device driver resource, a statistic collection routine that collects statistical information describing an operation of the data transfer routine, a network management routine that collects network management information describing operation of the device driver (e.g., port name information for determining relationships, and for locating and identifying external nodes), and/or a housekeeping routine that performs initialization and cleanup operations for the device driver. The administrative routine may include only one of the above-listed routines or any combination thereof.

In one arrangement, the data transfer routine has access to a restricted area of the memory, and the administrative routine does not have access to the restricted area. Rather, the administrative routine has access only to an administrative area which excludes the restricted area of the memory to prevent a memory access operation of the administrative routine from causing improper operation of the data transfer routine. Accordingly, if the administrative routine includes a programming bug causing improper operation of the administrative routine, the administrative routine will not corrupt the restricted area of the memory, and the data transfer routine can continue to operate normally.

In another arrangement, the first set of instructions is non-integrated with the second set of instructions (e.g., the second set of instructions executes as one or more separate processes). Accordingly, the device driver is non-monolithic in structure, and more particularly, separated in a manner that prevents improper processing of the second set of instructions from causing improper operation of the data transfer routine. Accordingly, improper execution of the second set of instructions (i.e., the administrative routine code) will not inadvertently cause improper execution of the first set of instructions (i.e., the data transfer routine code).

In yet another arrangement, the administrative routine includes a state storage routine that stores, in the memory, operating state information of the data transfer routine, and a backup routine that transfers data (e.g., uses the-port to receive or send data) using the operating state information, in response to a failure of the data transfer routine to transfer data using the port. Preferably, the backup routine remains available in an up and running, idle condition, i.e., a "hot-stand-by" condition.

In another arrangement, the memory further stores an upgrade application having a replacement set of instructions that is different than the second set of instructions of the device driver, and a control set of instructions that directs the processor to replace the second set of instructions of the device driver with the replacement set of instructions. The replacement set of instructions directs the processor to perform a new administrative routine. Preferably, the control set of instructions of the upgrade application is capable of swapping the second set of instructions with the replacement set of instructions while the processor operates under direction of the first set of instructions, i.e., while the data transfer routine operates. Accordingly, there can be dynamic replacement of the second set of instructions while the device driver is in operation.

Another embodiment of the invention is directed to a computer program product that includes a computer readable medium having instructions stored thereon for transferring data in a network. The instructions, when processed by a data communications device, cause the data communications device to perform the steps of (a) processing a first set of instructions to perform a data transfer routine that moves data between a memory and a port which is coupled to a network, and (b) processing a second set of instructions to perform an administrative routine. The first and second sets of instructions are arranged to prevent improper operation of the administrative routine from causing improper operation of the data transfer routine. Preferably, the data transfer routine has access to a restricted area of the memory, and the administrative routine does not in order to prevent a memory access operation of the administrative routine from causing improper operation of the data transfer routine.

Another embodiment of the invention is directed to a technique for operating a device, which involves loading, on a computer system, a device driver having a first set of instructions and a second set of instructions, processing the first set of instructions to perform a primary routine that operates the device, and processing the second set of instructions to perform an administrative routine. The first and second sets of instructions are arranged to prevent improper operation of the administrative routine from causing improper operation of the primary routine. In this embodiment, the primary routine may have access to a restricted area of the memory, while the administrative routine does not have such access to prevent a memory access operation of the administrative routine from causing improper operation of the primary routine. Preferably, a processor of the computer system executes the first set of instructions as a first process and the second set of instructions as a second process.

The first and second processes preferably communicate with each other using an interprocess communications mechanism. In one arrangement, the first and second processes communicate by exchanging data in a shared area of the memory. In another arrangement, the first and second processes communicate by passing messages to each other. In yet another arrangement, the first and second processes communicate using events and semaphores.

Another embodiment of the invention is directed to a technique for transferring data which involves processing a first set of instructions to perform a data transfer routine that moves data between memory and a port which couples to a network, and processing a second set of instructions to perform an administrative routine. The first and second sets of instructions are arranged to prevent improper operation of the data transfer routine from causing improper operation of the administrative routine, and to prevent improper operation of the administrative routine from causing improper operation of the data transfer routine. Preferably, the administrative routine includes a configuration routine that verifies and configures the port for data transfer. Furthermore, the administrative routine preferably includes a control routine that handles network control events.

The above-described features of the invention may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for transferring data using a device driver (e.g., a communications port device driver) which is arranged to prevent improper operation of a non-primary driver routine (e.g., an administrative operation) from causing improper operation of a primary driver routine (e.g., a data transfer operation). As such, the primary driver routine can continue to operate properly after a failure of the non-primary driver routine. These features may be particularly useful in computerized devices (e.g., data communications devices) such as those manufactured by Cisco Systems, Inc. of San Jose, Calif.

Figure 1:
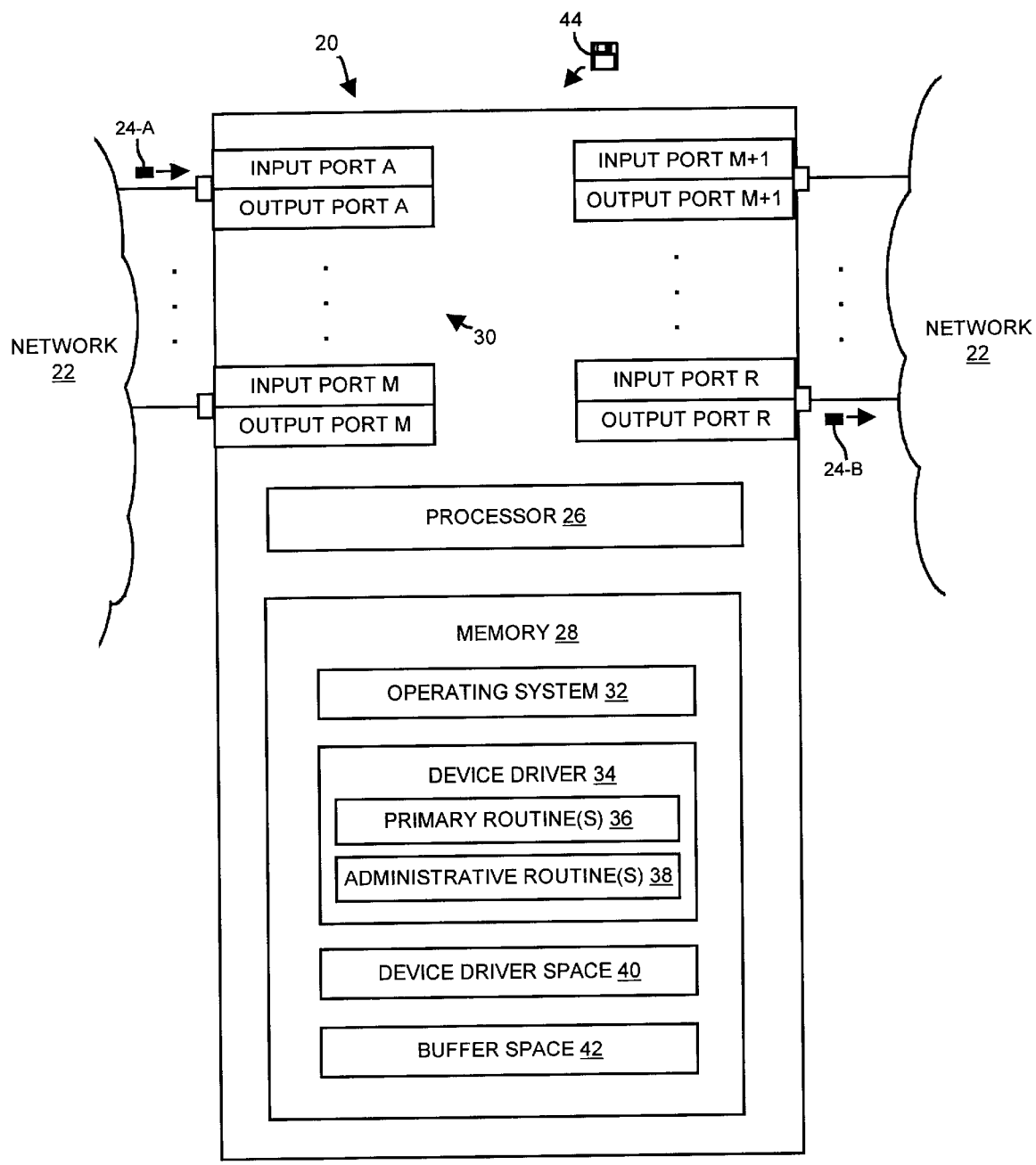
FIG. 1 is a block diagram of a data communications device configured according to the invention.

FIG. 1 shows a data communications device 20 that is suitable for use by the invention. The data communications device 20 is connected to a network 22 and transfers data from one portion of the network 22 to another. Various formats for the data are suitable for the invention including circuit switched formats, packets, cells, frames, or the like. However, for convenience and by way of example only, the device driver of the invention will be described as transferring data in the form of packets 24 (e.g., see packets 24-A and 24-B in FIG. 1).

The data communications device 20 includes a processor 26, memory 28 and multiple ports 30 (e.g., input and output ports A through input and output ports R). The memory 28 stores an operating system 32 and a device driver 34 having one or more primary routines (or portions) 36 and one or more administrative routines (or portions) 38 (i.e., non-primary routines). The memory 28 includes additional memory locations for use during normal operation of the device 20 such as device driver space 40 for storing state information for the device driver 34 and buffer space 42 for temporarily storing the packetized data 24.

In one arrangement, the device driver 34 installs on the data communications device 20 from a computer program product 44. In this arrangement, the computer program product 44 may further include the operating system 32 for the data communications device 20, or the device driver 34 may form a portion of the operating system 32 (i.e., the device driver 34 may be bundled as part of the operating system 32). For example, the operating system 32 and the device driver 34 may belong to the Cisco IOS manufactured by Cisco Systems, Inc. of San Jose, California. In another arrangement, device driver 34 is shipped separately from the operating system 32 (e.g., in the computer program product 44, or from a network download from a network server, etc.).

The primary routines 36 of the device driver 34 include instructions for performing one or more primary device operations on a device of the data communications device 20. For example, a primary operation of a device driver for a storage device (e.g., a disk drive) is to store data to and retrieve data from the storage device. Similarly, a primary operation of a device driver for a printer device is to convey characters and symbols to the printer device in a manner that enables the printer device to properly print such characters and symbols onto a printable medium, and so on.

In contrast to the primary routines 36 that perform the primary operations, the administrative routines 38 of the device driver 34 include instructions for performing non-primary operations that are related to the primary operations. For example, in the context of the storage device, a non-primary operation of the storage device driver may be to load balance data transfer operations through multiple paths leading to the storage device, to change operating modes of the storage device (e.g., online, offline and faulted), and to gather statistics. Similarly, for a printer device, a non-primary operation of the printer driver may be to change operating parameters of the printer device (e.g., printer buffer size, print quality, etc.), to switch between a power-saving (or sleep) mode and a normal operating (or ready) mode, and to signal events such as out-of-paper conditions, paper jams, and low-toner conditions, and so forth.

Preferably, the device driver 34 of the data communications device 20 is a data communications port driver for controlling a port 30 or a pair of ports 30 (e.g., input port M and output port M). In this arrangement, primary routines 36 of the device driver 34 manipulate hardware registers and memory to enable data to be received on a input port or sent on an output port. In the situation where the device driver 34 controls a pair of ports, the primary routines 36 of the device driver 34 are preferably organized into separate modules (e.g., two halves), one for controlling the transmission of data through the output port of that pair and one for controlling the reception of data through the input port of that pair.

Additionally, the administrative routines 38 of the device driver 34 preferably include instructions for performing non-primary operations such as creating and destroying connections used by the primary routines 36 of the device driver 34, changing operation parameters (e.g., data transfer rates, packet/cell formats, address information, and other state information), and gathering statistics.

In conventional monolithically structured device drivers, instructions for performing primary and non-primary operations are mixed together as a single series of instructions performed in a single process. Accordingly, the instructions for the non-primary operations generally have equal access to the same resources as the instructions for the primary operations. Accordingly, the instructions for the primary and non-primary operations are not arranged to prevent a problem in a non-primary operation from causing a problem in a primary operation, and vice versa. Rather, a coding problem in the instructions for a non-primary operation (e.g., due to improper coding, compilation, linking, or a combination thereof) may cause improper instruction execution (e.g., an improper branch or an improper updating of a variable in a calculation). Such problems can easily affect a primary operation due to the mixing of the instructions and sharing of resources.

In contrast to a conventional monolithically structured device driver that executes as a single process, the invention employs an execution control mechanism to prevent a problem arising during execution of an administrative routine 38 from generating a problem during execution of a primary routine 36, and a communication control mechanism to prevent data (e.g., operating parameters) used by a primary routine 36 from being corrupted by a non-primary operation of an administrative routine 38. Further details of the execution control mechanism and the communication control mechanism will be provided with reference to FIG. 2.

In accordance with the invention, an execution control mechanism arranges the primary routines 36 relative to the administrative routines 38 such that, after a primary routine 36 begins performing a primary operation, improper operation of an administrative routine 38 does not cause improper operation of the primary routine 36. In one arrangement, the execution control mechanism is the operating system 32 which, in a conventional manner, transfers control between a kernel and a number of processes running on the processor 26. In this arrangement, the primary routines 36 run in a first process 46 (or multiple primary processes) and the administrative routines 38 run in a second process 48 (or multiple non-primary processes).

Figure 2:
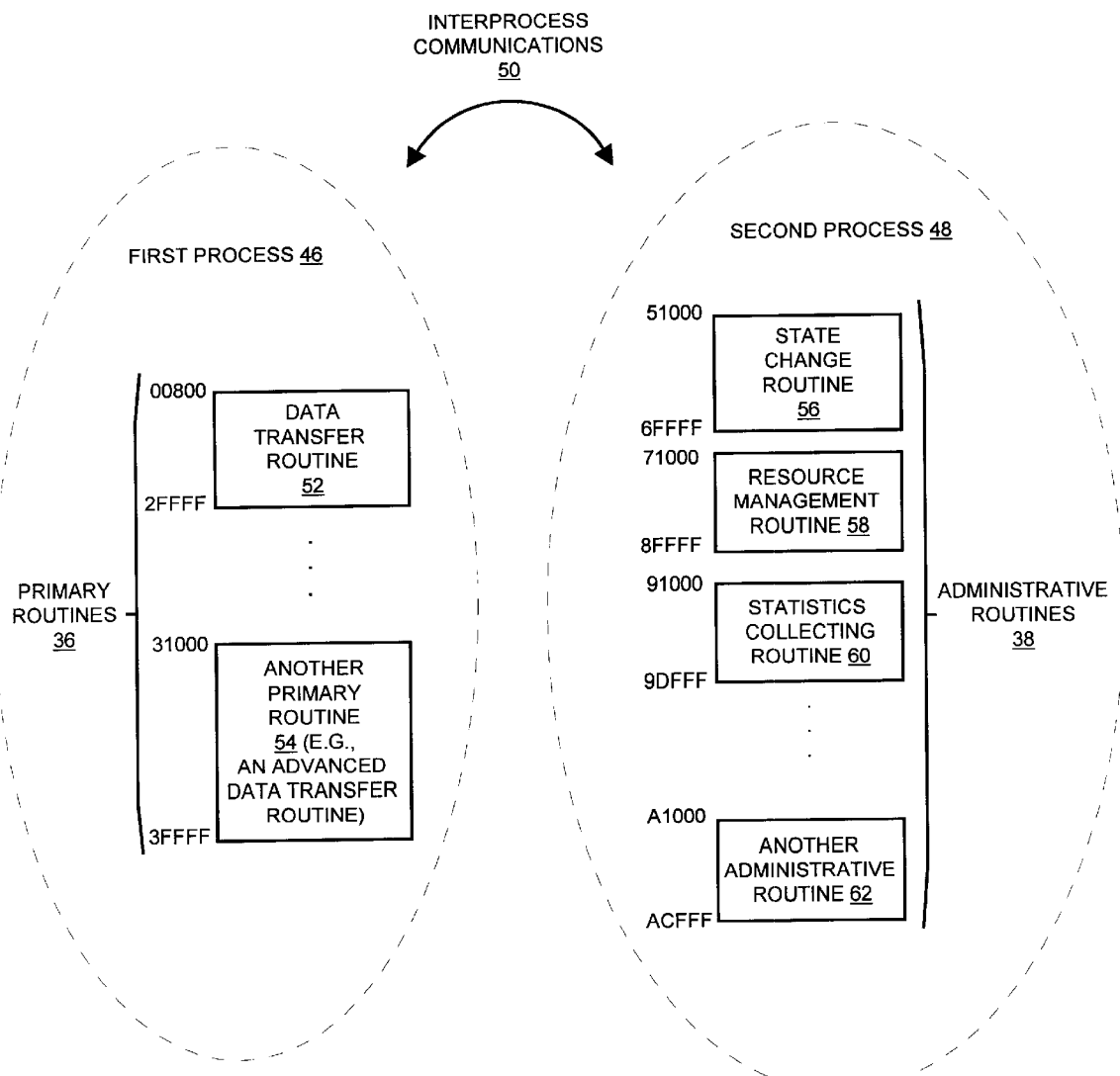
FIG. 2 is a block diagram of a multi-process arrangement for a device driver of the data communications device of FIG. 1.

As shown in FIG. 2 and by way of example only, the first process 46 includes a primary routine, namely a data transfer routine 52 that spans memory locations x00800 through x2FFFF. Optionally, the first process 46 may include other primary routines such as primary routine 54 that spans memory locations x31000 through x3FFFF.

In a manner similar to the first process 46 and by way of example only, the second process 48 includes a state change routine which spans memory locations x51000 through x6FFFF, a resource management routine 58 which spans memory locations x71000 through x8FFFF, and a statistics collecting routine 60 which spans memory locations x91000 through x9DFFF. Optionally, the second process 48 may include other administrative routines such as routine 62 which spans memory locations xA1000 through xACFFF (e.g., a control routine that causes a control change in the device driver 34 during operation, a network management routine that collects network management information describing operation of the device driver, a housekeeping routine that performs initialization and cleanup operations, etc.).

In a conventional manner, the operating system 32 imposes a level of privacy and security to each process 46, 48 by giving each process exclusive access to its own set of resources including an individual memory space and time slices (i.e., processor time). Accordingly, once the primary routines 36 have begun operating properly, improper instruction execution in the second process 48 (e.g., an improper branch or incorrect calculation) does not cause improper instruction execution of instructions of the first process 46. For example, a particular variable used by the first process 46 cannot be corrupted by an improper storage operation of the second process 48 since the two processes 46, 48 operate in separate process memory spaces.

Referring back to the two process arrangement illustrated in FIG. 2, interprocess communications (IPC) 50 serves as a communication control mechanism that (i) enables handshaking between primary routines 36 (i.e., the first process 46) and administrative routines 38 (i.e., the second process 48) but (ii) maintains a level of security to avoid corruption of critical, private resources (e.g., non-shared variables). Preferably, only data that the first process 46 is willing to share with the second process 48 is made available to the second process 48 (e.g., statistical information for the statistics gathering routine 60). Furthermore, when sharing such data, the first process 46 passes a copy of the data to the second process 48 through the IPC mechanism to prevent the second process 48 from inadvertently corrupting the original data due to improper operation. Preferably, the IPC mechanism enables the first process 46 to continue providing copies of data regardless of whether the second process 48 receives the data. In this arrangement, a partial or complete failure of the second process 48 does not harm or interfere with the continued operation of the first process 46.

A variety of IPC mechanisms are suitable for use by the invention. In one arrangement, the first and second processes 46, 48 communicate directly with each other by sharing an area of the memory 28, and using locking mechanisms (e.g., mutual exclusion mechanisms, test-and-set mechanisms, semaphores, etc.) to coordinate access to the shared area of the memory 28. Such locking mechanisms provide fairly direct communication between the two processes 46, 48 in order to minimize overhead. In an alternative arrangement, an operating system abstraction such as message passing (e.g., send/receive buffering routines, pipes, ports, etc.) is implemented to enable the first and second processes 46, 48 to communicate indirectly by sending and receiving messages. Such a message passing mechanism provides for more secure communication between the two processes 46, 48 for added safety against data corruption since the second process 48 cannot inadvertently overwrite any variables accessed by the first process 46. By way of example only, the employment of a few alternative IPC mechanisms will now be described further with reference to FIGS. 3–5.

Figure 3:
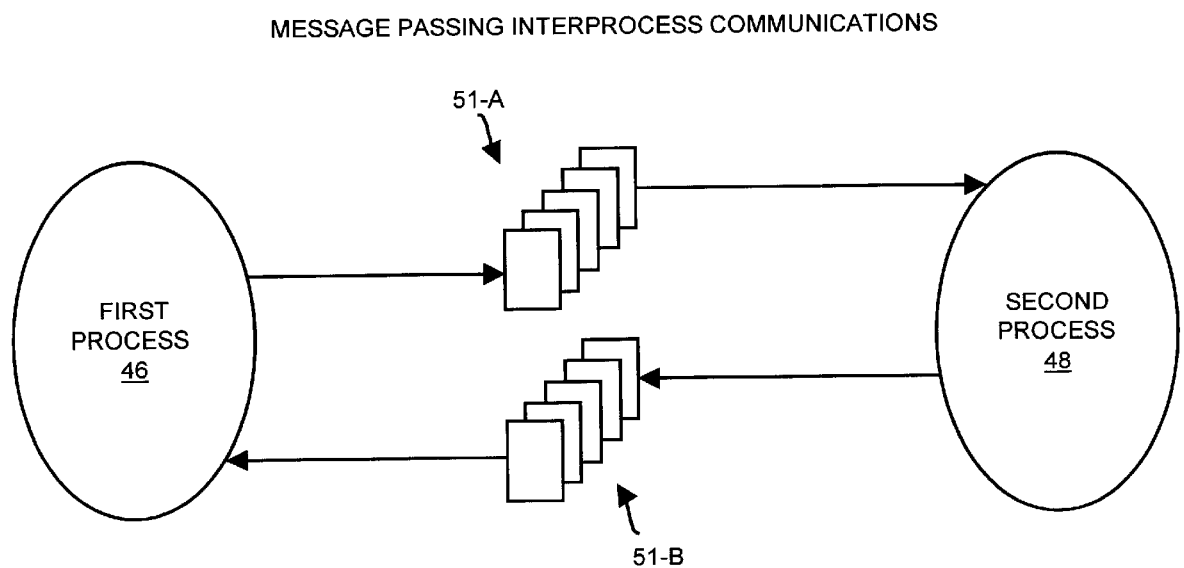
FIG. 3 is a block diagram of a message passing interprocess communications mechanism employable by the multi-process device driver arrangement of FIG. 2.

FIG. 3 shows an exemplary message passing IPC arrangement between the first process 46 and the second process 48. In this arrangement, the first process 46 passes information (e.g., operating state information, statistical data, etc.) through messages 51-A to the second process 48. Similarly, the second process 48 provides information (e.g., connection information, address and transmission rate information, etc.) to the first process 46 through messages 51-B. In this arrangement, a failure of the second process 48 such that it becomes unable to read the messages 51-A, or unable to provide the message 51-B is not catastrophic. Rather, the first process 46 continues to perform its primary operations (e.g., moving data between memory and a port).

Figure 4:
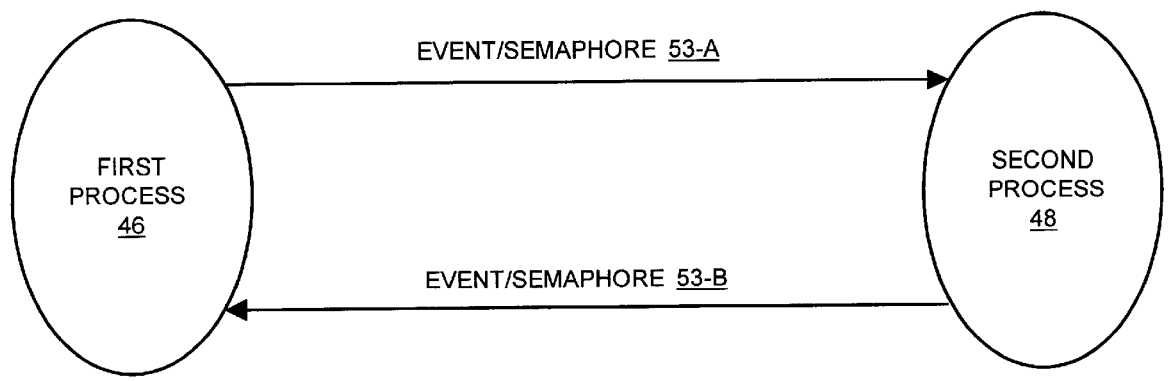
FIG. 4 is a block diagram of an alternative event/semaphore interprocess communications mechanism employable by the multi-process device driver arrangement of FIG. 2.

FIG. 4 shows an event/semaphore IPC arrangement between the first process 46 and the second process 48. In this arrangement, the first process 46 and the second process coordinate semaphore resources provided by the operating system 32 in order to exchange information. As shown in FIG. 4 by way of example only, the first process 46 manipulates (e.g., signals) a semaphore 53-A, and the second process 48 manipulates a semaphore 53-B. As with the message passing IPC arrangement, a failure of the second process 48 does not prevent the first process 46 from continuing to perform its primary operations.

Figure 5:
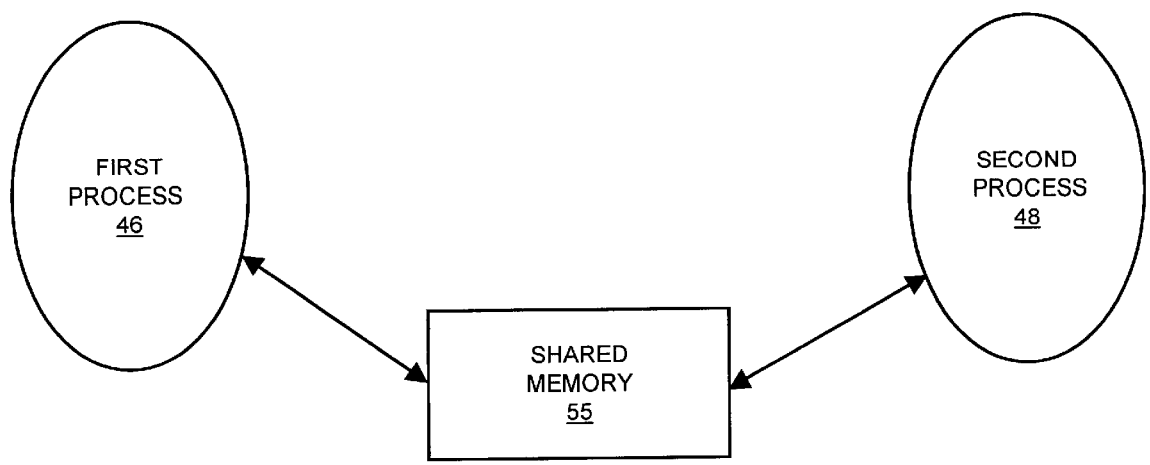
FIG. 5 is a block diagram of an alternative shared memory interprocess communications mechanism employable by the multi-process device driver arrangement of FIG. 2.

FIG. 5 shows a shared memory IPC arrangement between the first process 46 and the second process 48. In this arrangement, the first process 46 passes information (e.g., operating state information, statistical data, etc.) through shared memory 55 (e.g., a shared area of the memory 28). Similarly, the second process 48 provides information to the first process 46 through the shared memory 55. The shared memory IPC arrangement provides less operating system overhead than the message passing and event/semaphore IPC mechanisms, but requires more coding to properly coordinate and synchronize the use of the shared memory 55.

Figure 6:
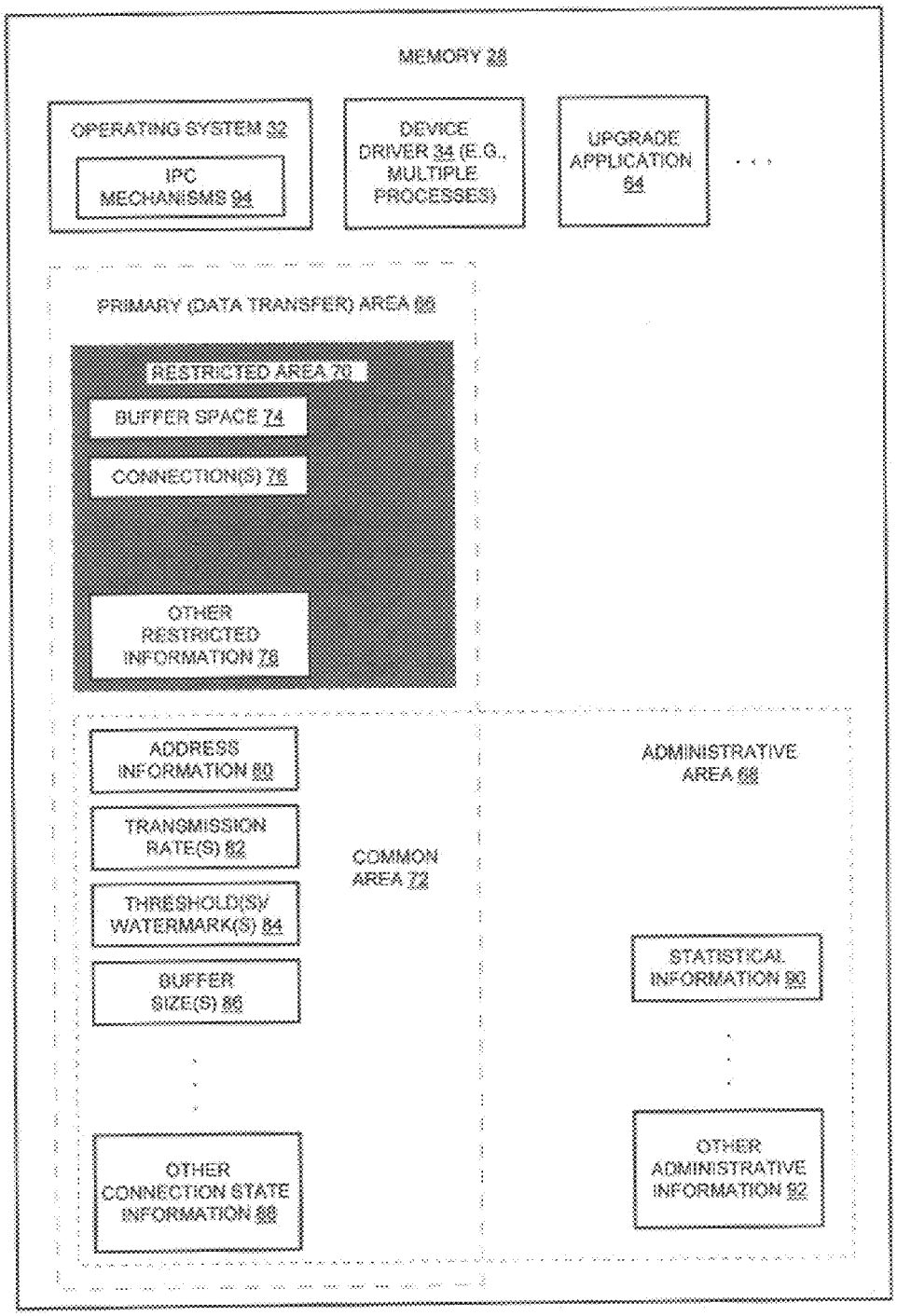
FIG. 6 is a block diagram of memory of the data communications device of FIG. 1 when the multi-process device driver arrangement shown in FIG. 2 employs the shared memory interprocess communications mechanism shown in FIG. 5.

FIG. 6 shows, by way of example, further details of a shared memory IPC mechanism arrangement that is suitable for use by the invention. According to the arrangement, the memory 28 includes the operating system 32, the device driver 34 and other elements such as an upgrade application 64 for upgrading the device driver 34. The operating system 32 includes resources for providing IPC mechanisms 94. As mentioned above, the device driver 34 is preferably instantiated as multiple processes (see processes 46, 48 in FIG. 2).

As shown in FIG. 6, the first process 46 for performing primary operations (e.g., data transfer operations) has access to a primary area 66 of the memory 28. Additionally, the second process 48 has access to an administrative area 68 of the memory 28 that overlaps the primary area 66.

By way of example only, the primary area 66 includes a restricted area 70 and a common area 72. The restricted area 70 includes buffer space 74 (e.g., a portion of the buffer space 42 for temporarily storing packetized data 24, see FIG. 1), connection information 76 for maintaining connections for data transfer, and perhaps other information 78. The common area 72 includes address information 80, transmission rate information 82, threshold/watermark information 84, buffer size information 86 and perhaps other connection state information 88. The administrative area 68 includes, in addition to the common area 72, other memory space such as that dedicated to statistical information 90 and other administrative information 92.

It should be understood that the second process 68 does not have access to the restricted area 70. Accordingly, critical data that is vital to proper operation of the first process 46 is preferably positioned in the restricted area 70. Improper operation of the second process 48 will not corrupt the contents of the restricted area 70. One way to restrict access to the restricted area 70 is for the operating system 32 to allow the first process 46 to maintain a lock over the restricted area. As an added precaution to prevent corruption of the common area 72 from improper operation of the second process 48, the operating system 32 preferably allows the first process 46 to have write access to the common area 72, and provides the second process 48 with only read access to common area 72.

It should be further understood that due to the modularized structure of the routines, an instruction execution problem in one routine is less likely to cause an execution problem in another routine of the same process. For example, an execution problem in one administrative routine (e.g., see statistics collecting routine 60 in FIG. 2) is less likely to cause an execution problem (e.g., improper operation) in another administrative routine (e.g., a resource management routine 58). Accordingly, an execution problem within a particular routine is likely to remain restricted to that routine. This arrangement provides additional fault-tolerance to the device driver 34.

Figure 7:
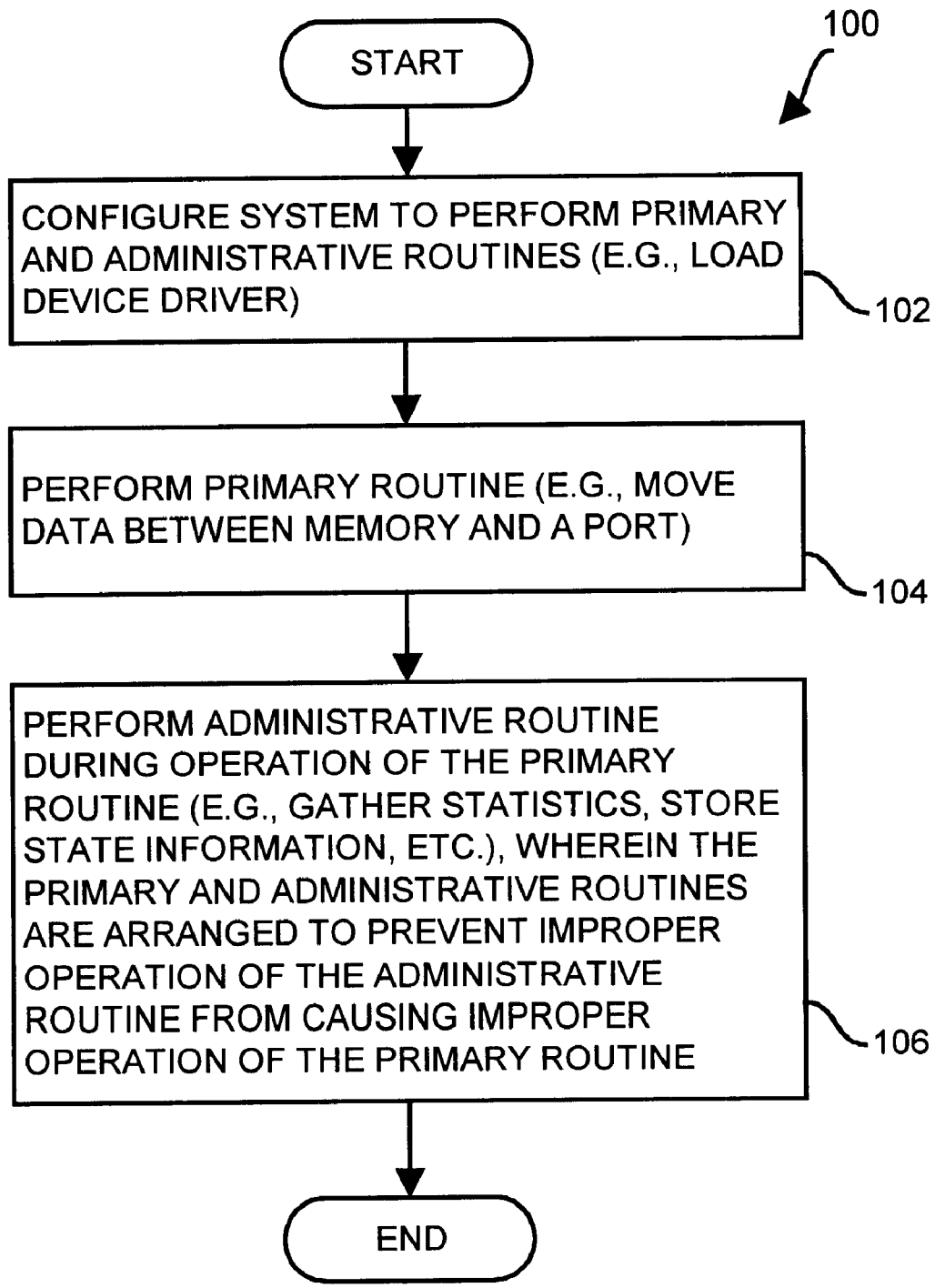
FIG. 7 is a flow chart illustrating a general operation of the data communications device of FIG. 1.

FIG. 7 illustrates a procedure 100 of the data communications device 20 when using the device driver 34. In step 102, the operating system 32 configures the data communications device 20 to perform the primary routines 36 and the administrative routines 38. By way of example, the operating system 32 loads the device driver 34 and begins each process 46, 48 making a port 30 (or a pair of ports) available for use in data transfer.

In step 104, the operating system 32 passes control to the first process 46 to perform a primary routine 36 (e.g., data transfer). In response, the first process 46 accesses its process resources including the primary area 66 (see FIG. 3) to perform a primary operation such as manipulating registers and memory to transfer data between the port 30 (e.g., INPUT PORT A or OUTPUT PORT R) and memory. In one arrangement, the first process 46 initiates the primary operation based on configuration information (e.g., from a configuration file). In another arrangement, the first process 46 waits to initiate the primary operation until receiving an IPC signal from the second process 48 (e.g., a request from the second process 48 to set up of a connection).

In step 106, the operating system 32 passes control to the second process 48 which performs an administrative routine 38 such as gathering statistics and storing state information. Due to arrangement of the two processes 46, 48, it should be understood that improper operation of the administrative routine 38 does not cause improper operation of the primary routine 36. In particular, improper execution of instructions in the second process 48 (e.g., an improper branch) cannot "spill over" and cause improper instruction execution in the first process 46. Furthermore, protected critical data used by the first process 46 cannot be overwritten inadvertently by the second process 48.

Figure 8:
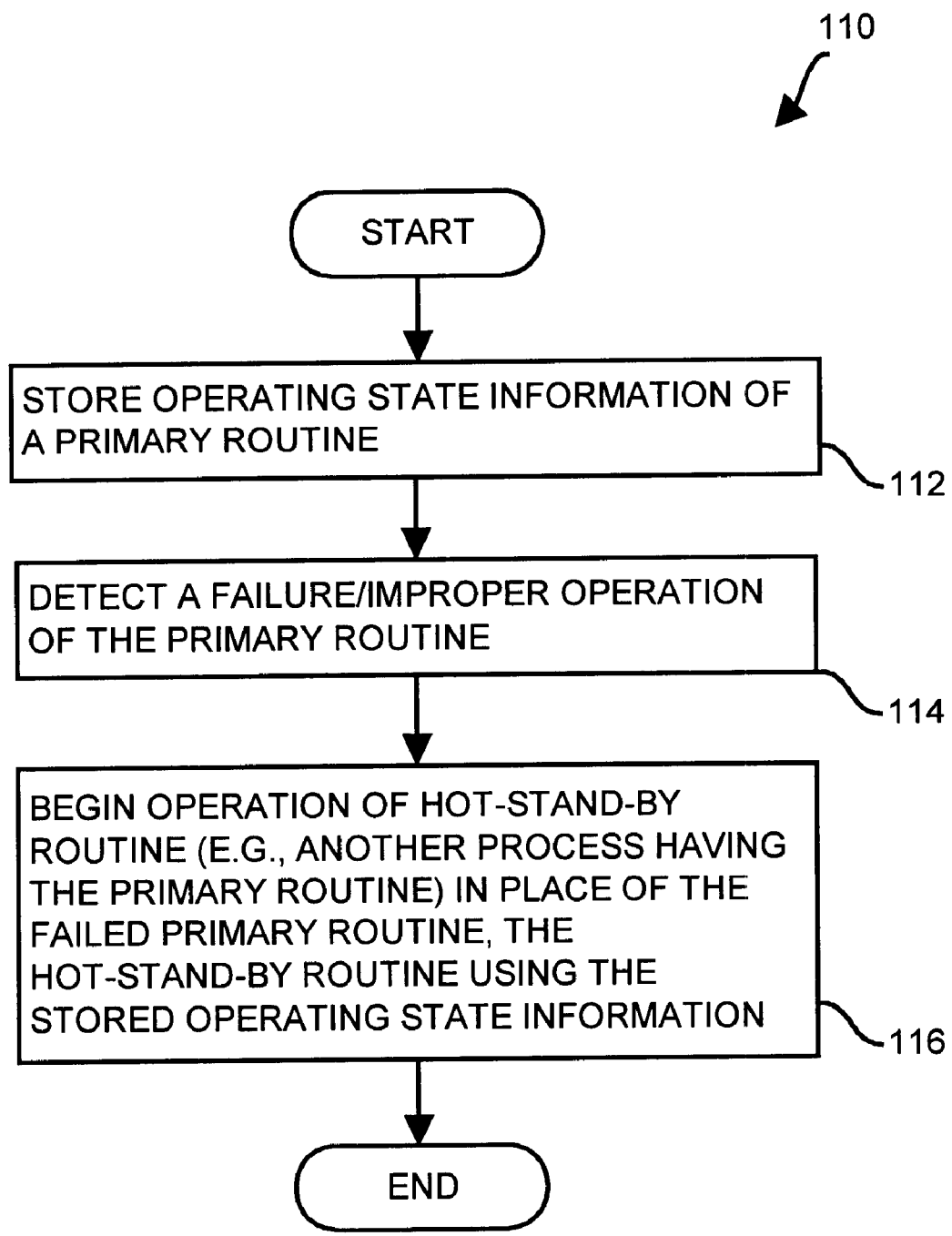
FIG. 8 is a flow chart illustrating a hot-stand-by failover operation of the data communications device of FIG. 1.
Figure 9:
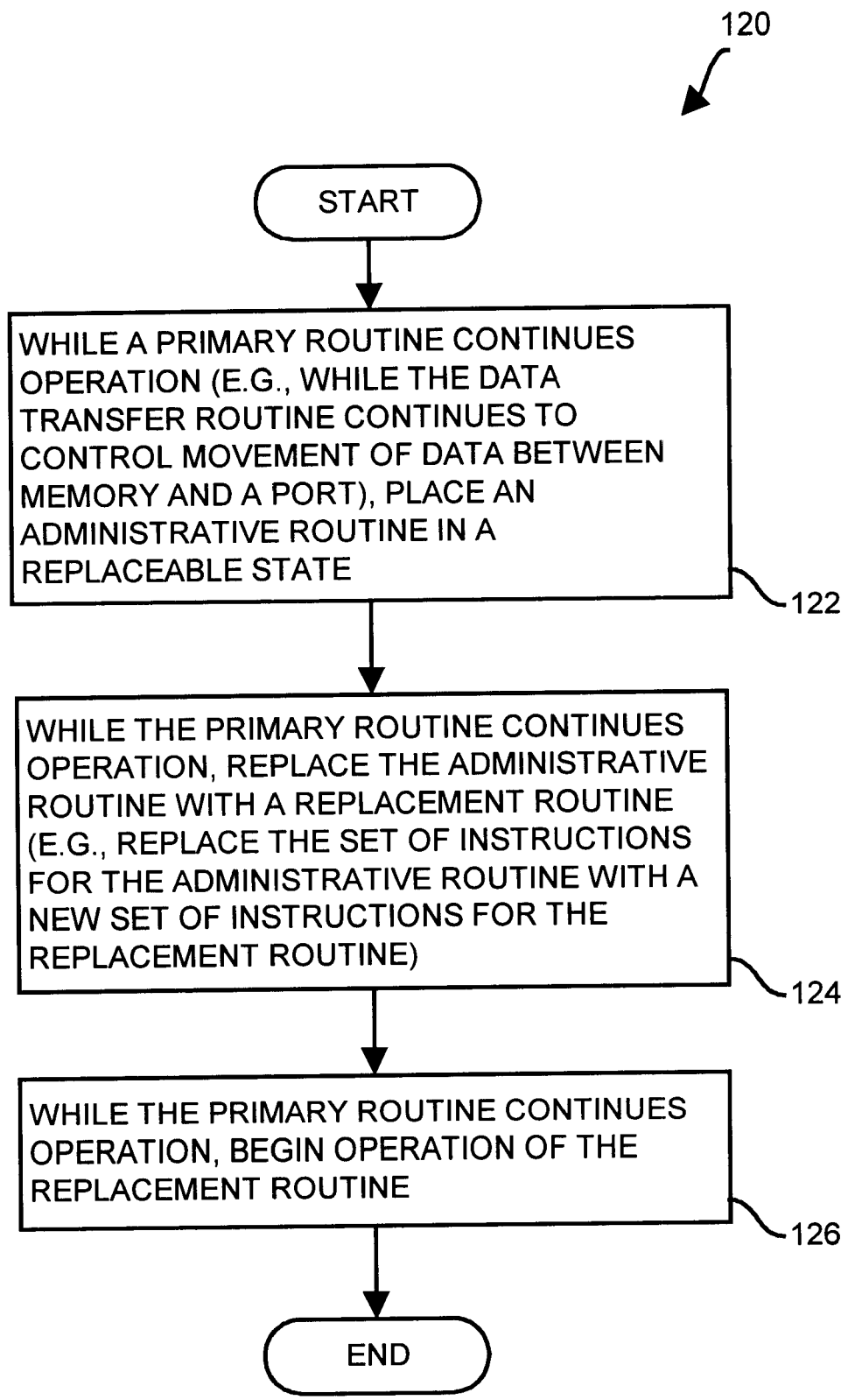
FIG. 9 is a flow chart illustrating a routine replacement operation of the data communications device of FIG. 1.

Further features of the invention will now be described with reference to FIGS. 8 and 9. The invention includes a "hot-stand-by" feature that allows a backup process to the first process 46 (i.e., essentially a copy of the first process 46) to stand-by in an idle state, and then fill-in for the first process 46 if the first process 46 should fail. FIG. 8 shows a procedure 110 illustrating the operation of the hot-stand-by feature.

In step 112, one of the processes 46, 48 stores state information used by the first process 46. Preferably, the second process 48 stores this state information in order to off load this work from the first process 46. The stored state information provides enough detail of the operation of the first process 46 to enable a backup process having the same primary routines 36 as the first process 46 to fill-in and continue in place of the first process 46 if the first process 46 should fail.

In step 114, the second process 48 detects a failure or improper operation of the first process 46. For example, the second process 48 may fail to receive a heartbeat or updated data from the first process 46 within a particular timeout period.

In step 116, the second process 48 instructs the backup process to the first process 46 to begin operation in place of the first process 46. To this end, the backup process uses the stored state information acquired in step 112 (e.g., connection details, address and rate information, etc.). The backup process essentially picks up where the failed first process 46 left off in order to continue the primary operation (e.g., transferring packets 24 between ports).

It should be understood that the above-described hot-stand-by feature provides additional fault-tolerance to the system, i.e., the data communications device 20. In particular, the separation of the various routines into multiple processes enables the certain operations such as the primary operation to fail and recover without having to close the device driver 34 completely.

Another feature of the invention is the capability for dynamic routine replacement. That is, a routine can be replaced without having to stop operation of the device driver 34 completely. For example, one of the administrative routines 38 of the device driver 34 can be replaced while the primary routines 36 continues operation. FIG. 9 shows a procedure 120 of this operation.

In step 122, while the primary routine 36 continues operation (e.g., while the data transfer routine 52 of the first process 46 continues to move data between memory and a port), an upgrade application (e.g., the upgrade application 64 in FIG. 6) places the administrative routine 38 (i.e., the second process 48) in a replaceable state. For example, the upgrade application 64 deactivates or stops the second process 48 while the first process 46 continues.

In step 124, while the primary routine 36 continues operation, the upgrade application 64 replaces the administrative routine with a replacement routine. For example, the upgrade application 64 replaces the statistics gathering routing 60 with a new statistics gathering routine. As another example, the upgrade application 64 replaces all of the administrative routines 38 with new routines.

In step 126, while the primary routine 36 continues operation, the upgrade application 64 begins the replacement routine(s). For example, the upgrade application 64 starts a new process (similar to the second process 48) with the replacement routine(s).

It should be understood that the primary routine 36 continued operation while the second process was disabled and while an administrative routine was replaced. Essentially, the primary routine 36 need not distinguish such an event from a failure and restart of the second process 48. Alternatively, the primary routine 36 could be informed of the event. In either situation, an administrative routine is replaced with a new routine in a dynamic manner, i.e., while the primary routine 36 continued operation.

As explained above, the invention is directed to techniques for transferring data using a device driver that is constructed and arranged to prevent improper operation of a non-primary driver routine from causing improper operation of a primary driver routine. As such, the primary driver routine can continue to operate properly after a failure of the non-primary driver routine.

As a result of this invention, it is anticipated that future device driver design will evolve toward the splitting of primary and non-primary routines, and running these routines in separate processes in accordance with the details of the above-described invention. As device driver developers partition their driver routines in the above-described manner, non-primary operations can be performed through the non-essential hardware interface (e.g., the second process 48). As more operations are migrated to the non-essential portion, less IPC will be required thus reducing the interdependence between essential and non-essential portions (i.e., reducing the amount of IPC and interdependence between the first and second processes 46, 48).

The features of the invention may be particularly useful in computerized devices manufactured by Cisco Systems, Inc. of San Jose, Calif.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the invention is suitable for use on apparatus other than a data communications device. In particular, the invention is suitable for use on a general purpose computer. Moreover, the device driver 34 need not be a data communications port device driver. Rather, other types of device drivers can be constructed and arranged for use with other types of devices. For example, the invention may be used for a printer driver, a storage or disk driver, a network driver, or a display driver.

Additionally, in the context of a data communications device 20, the data need not be transferred in the form of packets (e.g., packets 24-A and 24-B in FIG. 1). Rather, the data can be transferred in a variety of different ways depending on the particular type of data transfer device. Some other examples include circuit switched formats, wireless formats, frames, and cells.

Furthermore, the separation of primary and non-primary operations can be customized into large or small groupings. For example, in the context of the data communications device 20, a single device driver 34 may be used to handle data transfer operations for all of the ports 30 (see FIG. 1). Alternatively, a device driver may be used for each pair of input and output ports (e.g., INPUT PORT M and OUTPUT PORT M, see FIG. 1). As another alternative, a device driver may be used for each port (e.g., one for INPUT PORT A, another for OUTPUT PORT A, etc.), and so on.

Additionally, it should be understood that the term "routine" refers to a group of instructions (or a portion of code) for performing a particular operation. Specific programming languages may refer to such groupings using other terms such as functions, procedures, methods, processes, etc. and impose particular restrictions for each grouping.

It should be further understood that the device driver can be arranged such that the non-primary routines are equally protected against improper operation of the primary routines. That is, the same execution and communication control mechanisms can be implemented to prevent improper execution of a primary routine from causing improper execution of an administrative routine.

Furthermore, it should be understood that the memory 28 generally refers to the memory available to a computerized device. The memory 28 may include primary memory (e.g., semiconductor memory), secondary memory (e.g., disk storage, tape storage) and memory types (e.g., distributed memory throughout a network, CD-ROM, etc.). As such the memory 28 is not necessarily contiguous. Rather, a portion of the memory 28 may reside in one area of the computer (e.g., semiconductor memory that connects to the processor through a primary bus) and another portion of the memory 28 may reside locally relative to each port (e.g., as a dedicated buffer at each port, or as a centralized buffer with portions allocated to each port).

Additionally, it should be understood that each of the first process 46 and the second process 48 (see FIGS. 2–5) can be multiple processes. As such, the same privacy, security and failure protection provided by the operating system 32 to the first and second processes 46, 48 (as single processes) is made available to the multiple processes. Accordingly, a failure of one of multiple second processes 48 when performing an administrative routine still will not cause a failure of any of the first processes 46. As a result, each of the first processes 46 can continue operating to control data movement between memory and a port.

Furthermore, the message passing, event/semaphore and shared memory IPC mechanisms described with reference to FIGS. 3-5 are alternative IPC mechanisms that are suitable for use by the invention. Other alternative IPC mechanisms, as well as any combination of these IPC mechanisms can be employed by the invention, and such use is considered as part of an arrangement of the invention.

What is claimed is:

1. A data communications device for transferring data, comprising:
    a port that couples to a network;
    a processor coupled to the port; and
    memory, coupled to the processor, that stores a device driver, the device driver including:
        a first set of instructions that directs the processor to perform a data transfer routine that moves data between the port and the memory, and
        a second set of instructions that directs the processor to perform an administrative routine, the first and second sets of instructions being arranged to prevent improper operation of the administrative routine from causing improper operation of the data transfer routine.

2. The data communications device of claim 1, wherein the administrative routine includes:
    a state change routine to cause a state change in the device driver when operating in the data communications device.

3. The data communications device of claim 1, wherein the administrative routine includes:
    a control routine to cause a control change in the device driver when operating in the data communications device.

4. The data communications device of claim 1, wherein the administrative routine includes:
    a resource management routine to manage a device driver resource.

5. The data communications device of claim 1, wherein the administrative routine includes:
    a statistic collection routine that collects statistical information describing an operation of the data transfer routine.

6. The data communications device of claim 1, wherein the administrative routine includes:
    a network management routine that collects network management information describing operation of the device driver.

7. The data communications device of claim 1, wherein the data transfer routine has access to a restricted area of the memory, and wherein the administrative routine has access only to an administrative area of the memory that excludes the restricted area of the memory to prevent a memory access operation of the administrative routine from causing improper operation of the data transfer routine.

8. The data communications device of claim 1, wherein the first set of instructions is non-integrated with the second set of instructions to prevent improper processing of the second set of instructions from causing improper operation of the data transfer routine.

9. The data communications device of claim 1, wherein the administrative routine includes:
    a state storage routine that stores, in the memory, operating state information of the data transfer routine; and
    a backup routine that transfers data between the memory and the port using the operating state information, in response to a failure of the data transfer routine to transfer data between the memory and the port.

10. The data communications device of claim 1, wherein the memory further stores an upgrade application having:
    a replacement set of instructions that is different than the second set of instructions of the device driver; and
    a control set of instructions that directs the processor to replace the second set of instructions of the device driver with the replacement set of instructions, wherein the replacement set of instructions directs the processor to perform a new administrative routine.

11. The data communications device of claim 1, wherein the administrative routine includes:
    a housekeeping routine that performs initialization and cleanup operations for the device driver.

12. The data communications device of claim 1 wherein the processor runs an operating system; wherein the processor is configured to (i) execute the first set of instructions that directs the processor to perform the data transfer routine in a first process, and (ii) execute the second set of instructions that directs the processor to perform the administrative routine in a second process; and wherein the operating system imposes process level security and privacy on the first and second processes to separate the first and second processes.

13. The data communications device of claim 12 wherein the first process and the second process are configured to communicate through interprocess communications imposed by the operating system.

14. The data communications device of claim 12 wherein the first process is configured to access a first set of memory locations having a common area and a restricted area, wherein the second process is configured to access a second set of memory locations having an administrative area and the common area to share data with the first process through the common area.

15. The data communications device of claim 12, further comprising:
    multiple input ports and multiple output ports, wherein the first process which executes the first set of instructions is configured to route data elements received through the multiple input ports to the multiple output ports.

16. A method for transferring data, comprising the steps of:
    processing a first set of instructions to perform a data transfer routine that moves data between a memory and a port which is coupled to a network; and
    processing a second set of instructions to perform an administrative routine, the first and second sets of instructions being arranged to prevent improper operation of the administrative routine from causing improper operation of the data transfer routine.

17. The method of claim 16, wherein the first and second sets of instructions form a device driver, and wherein the step of processing the second set of instructions to perform the administrative routine includes the step of:
    performing a state change routine that causes a state change in the device driver when operating in a data communications device.

18. The method of claim 16, wherein the first and second sets of instructions form a device driver, and wherein the step of processing the second set of instructions to perform the administrative routine includes the step of:

performing a control routine to cause a control change in the device driver when operating in a data communications device.

19. The method of claim 16, wherein the first and second sets of instructions form a device driver, and wherein the step of processing the second set of instructions to perform the administrative routine includes the step of:

performing a resource management routine that manages a device driver resource.

20. The method of claim 16, wherein the step of processing the second set of instructions to perform the administrative routine includes the step of:

collecting statistical information describing an operation of the data transfer routine.

21. The method of claim 16, wherein the step of processing the second set of instructions to perform the administrative routine includes the step of:

collecting network management information describing operation of the device driver.

22. The method of claim 16, wherein the data transfer routine has access to a restricted area of the memory, and wherein the administrative routine has access only to an administrative area of the memory that excludes the restricted area of the memory to prevent a memory access operation of the administrative routine from causing improper operation of the data transfer routine.

23. The method of claim 16, wherein the first set of instructions is non-integrated with the second set of instructions to prevent improper processing of the second set of instructions from causing improper operation of the data transfer routine.

24. The method of claim 16, wherein the step of processing the second set of instructions includes the steps of:

storing, in the memory, operating state information of the data transfer routine; and transferring data between the memory and the port using the operating state information, in response to a failure of the data transfer routine to transfer data between the memory and the port.

25. The method of claim 16, wherein the first and second sets of instructions form portions of a device driver, and wherein the method further comprises the steps of:

running a replacement application that replaces the second set of instructions of the device driver with a replacement set of instructions that is different than the second set of instructions; and processing the replacement set of instructions to perform a new administrative routine.

26. The method of claim 16, wherein the step of processing the second set of instructions to perform the administrative routine includes the step of:

performing initialization and cleanup operations for the device driver.

27. The method of claim 16 wherein the step of processing the first set of instructions to perform the data transfer routine includes the step of executing the first set of instructions in a first process; wherein the step of processing the second set of instructions to perform the administrative routine includes the step of executing the second set of instructions in a second process; and wherein the method further comprises the step of:

imposing process level security and privacy on the first and second processes to separate the first and second processes.

28. A computer program product that includes a computer readable medium having instructions stored thereon for transferring data such that the instructions, when processed by a data communications device, cause the data communications device to perform the steps of:

processing a first set of instructions to perform a data transfer routine that moves data between a memory and a port which is coupled to a network; and processing a second set of instructions to perform an administrative routine, the first and second sets of instructions being arranged to prevent improper operation of the administrative routine from causing improper operation of the data transfer routine.

29. The computer program product of claim 28, wherein the data transfer routine has access to a restricted area of the memory, and wherein the administrative routine has access only to an administrative area of the memory that excludes the restricted area of the memory to prevent a memory access operation of the administrative routine from causing improper operation of the data transfer routine.

30. A computer system, comprising:

a processor; and memory, coupled to the processor, that stores a device driver, the device driver including:

a first set of instructions that directs the processor to perform a primary routine that operates a device, and a second set of instructions that directs the processor to perform an administrative routine, the first and second sets of instructions being arranged to prevent improper operation of the administrative routine from causing improper operation of the primary routine.

31. The computer system of claim 30, wherein the primary routine has access to a restricted area of the memory, and wherein the administrative routine has access only to an administrative area of the memory that excludes the restricted area of the memory to prevent a memory access operation of the administrative routine from causing improper operation of the primary routine.

32. The computer system of claim 30, wherein the processor executes the first set of instructions as a first process and the second set of instructions as a second process, and wherein the first and second processes communicate by exchanging data in a shared area of the memory.

33. The computer system of claim 30, wherein the processor executes the first set of instructions as a first process and the second set of instructions as a second process, and wherein the first and second processes communicate by passing messages to each other.

34. The computer system of claim 30, wherein the processor executes the first set of instructions as a first process and the second set of instructions as a second process, and wherein the first and second processes communicate using events and semaphores.

35. In a computer system, a method for operating a device, comprising the steps of:

loading a device driver on the computer system, the device driver including a first set of instructions and a second set of instructions;

processing the first set of instructions to perform a primary routine that operates the device; and processing the second set of instructions to perform an administrative routine, the first and second sets of instructions being arranged to prevent improper operation of the administrative routine from causing improper operation of the primary routine.

36. The method of claim 35, wherein the primary routine has access to a restricted area of the memory, and wherein the administrative routine has access only to an administrative area of the memory that excludes the restricted area of the memory to prevent a memory access operation of the administrative routine from causing improper operation of the primary routine.

37. The method of claim 35, wherein the step of processing the first set of instructions includes the step of executing the first set of instructions as a first process, wherein the step of processing the second set of instructions includes the step of executing the second set of instructions as a second process, and wherein method further includes the step of:

exchanging data between the first and second processes in a shared area of the memory for interprocess communication.

38. The method of claim 35, wherein the step of processing the first set of instructions includes the step of executing the first set of instructions as a first process, wherein the step of processing the second set of instructions includes the step of executing the second set of instructions as a second process, and wherein method further includes the step of:

passing messages between the first and second processes for interprocess communication.

39. The method of claim 35, wherein the step of processing the first set of instructions includes the step of executing the first set of instructions as a first process, wherein the step of processing the second set of instructions includes the step of executing the second set of instructions as a second process, and wherein method further includes the step of:

exchanging data between the first and second processes using events and semaphores for interprocess communication.

40. A method for transferring data, comprising the steps of:

processing a first set of instructions to perform a data transfer routine that moves data between a memory and a port which is coupled to a network; and processing a second set of instructions to perform an administrative routine, the first and second sets of instructions being arranged to prevent improper operation of one of the data transfer routine and the administrative routine from causing improper operation of the other of the data transfer routine and the administrative routine.

41. The method of claim 40, wherein the administrative routine includes:

a configuration routine that verifies and configures the port for data transfer.

42. The method of claim 40, wherein the administrative routine includes:

a control routine that handles network control events.

* * * * *